US010770100B1

(12) United States Patent
Huang et al.

(10) Patent No.: US 10,770,100 B1
(45) Date of Patent: Sep. 8, 2020

(54) BALANCED CURRENT MIRRORS FOR BIASING A MAGNETIC RESISTOR IN A HARD DISK DRIVE

(71) Applicant: Marvell International Ltd., Hamilton (BM)

(72) Inventors: Xiaowei Huang, Singapore (SG); Mei Lei, Singapore (SG); Yunfan Zhang, Singapore (SG); Su Win Myat, Singapore (SG)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/702,983

(22) Filed: Dec. 4, 2019

Related U.S. Application Data

(60) Provisional application No. 62/775,795, filed on Dec. 5, 2018.

(51) Int. Cl.

| | |
|---|---|
| ***G11B 5/54*** | (2006.01) |
| ***G11B 5/39*** | (2006.01) |
| ***G05F 3/26*** | (2006.01) |
| *G11B 5/00* | (2006.01) |

(52) U.S. Cl.

CPC ............ *G11B 5/3932* (2013.01); *G05F 3/262* (2013.01); *G11B 2005/0018* (2013.01)

(58) Field of Classification Search

CPC ... G11B 20/0013; G11B 11/10; G11B 11/105; G11B 2005/0021; G11B 5/035; G11B 20/10046; G11B 20/10027; G11B 15/6895; G11B 5/54

USPC .................................. 360/46, 65, 67, 69, 75

See application file for complete search history.

(56) References Cited

U.S. PATENT DOCUMENTS 10,147,455 B1 * 12/2018 O'Brien ........... G11B 20/10027

* cited by examiner

*Primary Examiner* — Nabil Z Hindi

(57) ABSTRACT

A bias circuit comprises a closed loop gain stage arranged to determine a difference between a first current in a first branch circuit and a second current in a second branch circuit, where the first branch circuit and second branch circuit are coupled to respective terminals of a magnetic resistor (MR). A first set of current mirrors is arranged to provide a source current to the first terminal of the MR and the second set of current mirrors is arranged to provide a sink current to the second terminal of the MR. The first set of current mirrors and a second set of current mirrors are balanced to reduce a difference in setting time between the source current and sink current. The source current and sink current further reduce the difference between the first current and the second current to provide a constant voltage bias to the MR based on a voltage of a voltage source.

20 Claims, 3 Drawing Sheets

300

Start

Determine first current flowing in a first branch circuit coupled to a first node of an MR
302

Determine second current flowing in a second branch circuit coupled to a second node of an MR
304

Output a signal indicative of a difference between the first current and the second current
306

Amplify the output signal
308

Provide the amplified output signal to a current driver which generates a reference current based on the amplified output signal
310

Mirror by a top current mirror the reference current from the current driver to provide a source current and mirror by a bottom current mirror the reference current from the current driver to provide a sink current, where the top current mirror and bottom current mirror are balanced
312

Provide the source current to one terminal of the MR and the sink current to the other terminal of the MR to reduce the difference between the first current in the first branch and the second current in the second branch and provide a constant voltage bias to the MR based on a voltage of a voltage source
314

End

BALANCED CURRENT MIRRORS FOR BIASING A MAGNETIC RESISTOR IN A HARD DISK DRIVE

CROSS REFERENCE TO RELATED APPLICATION

This disclosure claims the benefit of priority under 35 U.S.C. § 119(e) of U.S. Provisional Application Ser. No. 62/775,795 filed Dec. 5, 2018, entitled, "Speed-balanced current mirror for magnetic resistor bias in HDD preamp", the contents of which is incorporated herein by reference in its entirety.

FIELD OF USE

This disclosure generally relates to the field of data storage, and more particularly to balanced current mirrors for biasing a magnetic resistor in a hard disk drive (HDD).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Hard disk drives (HDDs) have one or more magnetic disks and a read/write head positioned over the one or more magnetic disks for reading and writing data to the one or more magnetic disks. The read/write head has a magnetic source such as a magnetic coil which applies a varying magnetic field to the magnetic disk indicative of data to be written to the magnetic disk as the disk rotates. The magnetic field magnetizes portions of the magnetic disk in accordance with the applied magnetic field to write the data to the magnetic disk. To read the data that was written, the read/write head has a magnetic resistor (MR) whose resistance changes based on the magnetization of the magnetic disk under the read/write head as the magnetic disk rotates.

A preamplifier of the HDD outputs a signal indicative of this change in resistance which is used by signal processing circuitry to read the data on the magnetic disk. To facilitate generating this signal indicative of the change in resistance, the preamplifier has a bias circuit which applies a constant bias voltage across two terminals of the MR. If the resistance of the MR has not changed, then the voltage across the MR is the same as a voltage of a voltage source. If the resistance of the MR changes, then the voltage across the MR is not the same as the voltage of the voltage source. To maintain the constant bias voltage if the resistance changes, the bias circuit has a closed loop gain stage. The closed loop gain stage provides an output indicative of a difference between currents $i_1$, $i_2$ in respective branches of the bias circuit. Each branch includes a transistor with an emitter coupled to a terminal of the MR and a base coupled to a terminal of the voltage source. When currents $i_1$ and $i_2$ are not equal, then a base to emitter voltage ($V_{be}$) for one transistor in one branch is not equal to a base to emitter voltage ($V_{be}$) for the other transistor in the other branch and the voltage across the MR is not the same as the voltage of the voltage source. Based on the output from the closed loop gain stage, a source current generated by two current mirrors and a sink current generated by one current mirror are applied to respective terminals of the MR to cause $i_1$ and $i_2$ to be equal again. The bias voltage across the MR is equal again to the voltage of the voltage source.

The source current and the sink current each take time to each settle after being changed. Further, the time for each current to settle is different. The difference in settling time produces voltage glitches at the MR and on the signal output by the preamplifier which is used by signal processing circuitry to read the data on the magnetic disk.

SUMMARY

This disclosure generally relates to the field of data storage, and more particularly to balanced current mirrors for biasing a magnetic resistor (MR) in a hard disk drive (HDD).

Aspects of the disclosure provide a bias circuit comprising: a closed loop gain stage arranged to determine a difference between a first current in a first branch circuit and a second current in a second branch circuit, wherein the first branch circuit and the second branch circuit are coupled to respective terminals of a magnetic resistor (MR); and a first set of current mirrors and a second set of current mirrors which are balanced, the first set of current mirrors arranged to provide a source current to one of the terminals of the MR and the second set of current mirrors arranged to provide a sink current to another of the terminals of the MR to reduce the difference between the first current and the second current and provide a constant voltage bias to the MR based on a voltage of a voltage source.

In one example, the first set of current mirrors comprises a current source mirror which sources the source current to the MR and the second set of current mirrors comprises a current sink mirror which sinks the sink current from the MR. In another example, each set of current mirrors have a same number of current mirrors. In yet another example, when the difference between the first current and the second current is less than a threshold amount, a voltage across the terminals of the MR is equal to the voltage of the voltage source. In another example, the bias circuit further comprises a switch for providing the source current to the other of the terminal of the MR and the sink current to the one of the terminals of the MR. In yet another example, the bias circuit further comprises a current driver which provides a reference current to the first set of current mirrors and to the second set of current mirrors. In another example, the bias circuit further comprises a capacitor coupled between a gate of a transistor of the current driver and a voltage reference. In another example, the first set of current mirrors comprises a first NMOS (N-type metal oxide semiconductor) transistor and second NMOS transistor of a first current mirror and a third PMOS (P-type metal oxide semiconductor) transistor and fourth PMOS transistor of a second current mirror. In yet another example, the second set of current mirrors comprises a first PMOS transistor and second PMOS transistor of a first current mirror and a third NMOS transistor and fourth NMOS transistor of a second current mirror. In another example, a settling time of the source current and a settling time of the sink current are substantially equal.

Aspects of the disclosure provide method comprising: determining a difference between a first current in a first branch circuit and a second current in a second branch circuit, wherein the first branch circuit and the second branch circuit are coupled to respective terminals of a magnetic resistor (MR); outputting a reference current based on the difference; and performing a balanced mirroring of the reference current by a first set of current mirrors mirroring the reference current to provide a source current to one of the terminals and a second set of current mirrors mirroring the reference current to provide a sink current to another of the terminals, the source current and the sink current reducing the difference between the first current and the second current to provide a constant voltage bias to the MR based on a voltage of a voltage source.

In one example, the first set of current mirrors mirroring the reference current comprises mirroring the reference current by a current sink mirror which sinks the sink current from the MR. In another example, the current sink mirror inverts a direction of the reference current which is mirrored. In yet another example, the second set of current mirrors mirroring the reference current comprises mirroring the reference current by a current source mirror which sources the source current to the MR. In another example, a settling time of the source current and the sink current are substantially equal. In yet another example, the first set of current mirrors and the second set of current mirrors each comprise two current mirrors. In another example, the method further comprises determining data stored on a magnetic disk based on a resistance of the MR.

Aspects of the disclosure provide a bias circuit comprising: a first branch comprising a first resistor and a first transistor, wherein one terminal of the first resistor is coupled to a collector of the first transistor, another terminal of the first resistor is coupled to a voltage reference, and an emitter of the first transistor is coupled to one terminal of an MR; a second branch comprising a second resistor and a second transistor, wherein one terminal of the second resistor is coupled to a collector of the second transistor, another terminal of the second resistor is coupled to the voltage reference, and an emitter of the second transistor is coupled to another terminal of the MR; a closed loop gain stage comprising a transimpedance amplifier (TIA) with one input coupled to the one terminal of the first resistor and another input coupled to the one terminal of the second resistor and an input of an error amplifier (EA) coupled to an output of the TIA; a current driver coupled to an output of the EA; and a first set of current mirrors coupled to the current driver and the one terminal of the MR and a second set of current mirrors coupled to the current driver and the other terminal of the MR, wherein each set of current mirrors have a same number of current mirrors.

In one example, the first set of current mirrors comprises a first NMOS (N-type metal oxide semiconductor) transistor and second NMOS transistor of a first current mirror and a third PMOS (P-type metal oxide semiconductor) transistor and fourth PMOS transistor of second current mirror. In another example, the second set of current mirrors comprises a third PMOS transistor and fourth PMOS transistor of a third current mirror and a fifth NMOS transistor and sixth NMOS transistor of a fourth current mirror.

Figure 1:
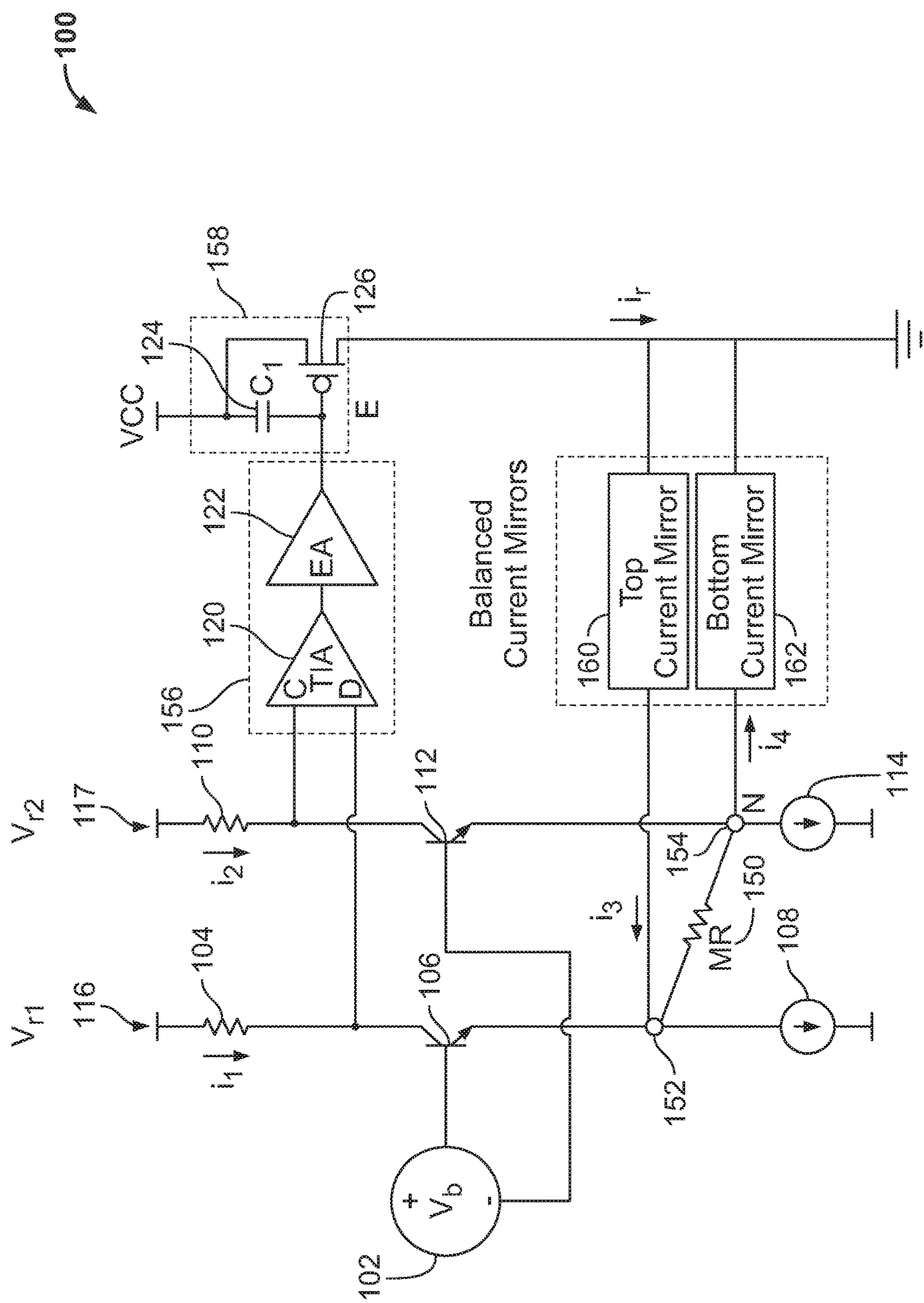
FIG. 1 is an example bias circuit in the preamplifier for biasing a magnetic resistor (MR) with balanced current mirrors for providing source current and sink current to the MR of a hard disk drive (HDD).

The drawings are for the purpose of illustrating example embodiments, but it is understood that the embodiments are not limited to the arrangements and instrumentality shown in the drawings.

DETAILED DESCRIPTION

This disclosure provides examples and details related to data storage and specifically a bias circuit for biasing a magnetic resistor (MR) in a hard disk drive (HDD) with balanced current mirrors which produce a source current and sink current to the MR with reduced difference in settling times. The disclosed bias circuit is not limited to use in the HDD and may be used in other types of circuitry or systems.

FIG. 1 is an example bias circuit 100 in a preamplifier of an HDD for biasing a magnetic resistor (MR) 150. The MR 150 is an electrical component which has a resistance that changes in a presence of a magnetic field. The MR 150 is used to read data that was written to a magnetic disk which is magnetized in accordance with data written to the magnetic disk during a write operation on the HDD. To read the data that was written, a read/write head of the HDD having the MR 150 is positioned over the magnetic disk of the HDD so that resistance of the MR 150 changes based on the magnetization of the magnetic disk under the read/write head as the magnetic disk rotates. The preamplifier is a circuit that outputs a signal indicative of this change in resistance which is used by signal processing circuitry to read the data on the magnetic disk. To facilitate generating this signal indicative of the change in resistance, the bias circuit 100 may include hardware and/or circuitry to provide a bias voltage to the MR 150 which is substantially equal to a voltage source 102, known as a constant bias voltage. The bias circuit 100 maintains the bias voltage across terminals 152, 154 of the MR 150 so that the signal indicative of the change in resistance may be determined as the resistance of the MR 150 changes in presence and absence of a magnetic field.

The bias circuit 100 has branch 116 and branch 117. Branch 116 may have a resistor 104, transistor 106, and current source 108 coupled together. One terminal of the resistor 104 may be coupled to a first voltage reference $V_{r1}$ and another terminal of the resistor may be coupled to a collector of the transistor 106. Further, an emitter of the transistor 106 may be coupled to the current source 108. Branch 117 may have a resistor 110, transistor 112, and current source 114 also coupled together. One terminal of the resistor 110 may be coupled to a second voltage reference $V_{r2}$ and another terminal of the resistor may be coupled to a collector of the transistor 112. In examples, $V_{r1}$ and $V_{r2}$ may have a same voltage. Further, an emitter of the transistor 112 may be coupled to the current source 114. The current source 108 and current source 114 may provide a path for current to flow in branch 116 and branch 117. The transistors 106 and 112 may be matched to have similar sizes and performance characteristics, and as shown, may take the form of a bipolar junction transistor (BJT). A voltage source 102 may be coupled to gates of the transistors 106, 112. The voltage source 102 may have a fixed or variable voltage.

So long as current $i_1$ flowing through branch 116 and current $i_2$ flowing through branch 117 is substantially the same, each of the transistors 106, 112 may have a substantially same base to emitter voltage ($V_{be}$), the voltage across the MR 150 is substantially the same as a voltage of the voltage source 102, and the MR 150 is constant voltage biased. The voltages may be substantially the same (or equal) if a difference between the currents $i_1$, $i_2$ is less than a threshold amount.

If the resistance of the MR 150 changes due to a change of a magnetic field, then the branch currents $i_1$ and $i_2$ are no longer equal and the voltage across the MR 150 is not substantially the same as the voltage of the voltage source 102. To return the bias voltage to the voltage of the voltage source 102, a closed loop gain stage 156 causes a source current $i_3$ to be provided to the terminal 152 and a sink current $i_4$ to be provided to terminal 154 to adjust the current $i_1$ flowing through branch 116 and current $i_2$ flowing through branch 117 so that the currents in each branch 116, 117 are equal again and the bias voltage across the terminals 152, 154 of the MR 150 is substantially equal to the voltage of the voltage source 102.

The closed loop gain stage 156 includes a transimpedance amplifier (TIA) 120 and an error amplifier (EA) 122. The TIA 120 has two inputs, one of which is coupled to a terminal of the resistor 110 and another of which is coupled to a terminal of resistor 104. An output of the TIA 120 is coupled an input of the EA 122.

The TIA 120 receives an indication of currents in each branch 116, 117 in terms of voltage at the respective terminal of resistor 104, 110. The TIA 120 converts the difference between the two voltages into a signal such an analog voltage indicative of the difference which is then amplified by the EA 122. The TIA 120 and EA 122 may form a two stage gain amplifier, but in other examples no EA 122 may be present in the closed loop gain stage 156 or more than two EAs may be present.

An output of the EA 122 may be coupled to a current driver 158. The current driver 158 may be a transistor 126 in the form of a P-type metal-oxide-semiconductor (PMOS) transistor arranged in saturation mode and the output of the EA 122 may be coupled to a gate of the transistor 126. In some examples, one terminal of a capacitor 124 may be coupled to a voltage source $V_{cc}$, and drain of the transistor 126 while another terminal of the capacitor 124 may be coupled to a gate of the transistor 126.

The current driver 158 may generate current $i_r$ as a function of a voltage across a gate and source of the transistor 126 based on the output of the EA 122. The capacitor 124 may limit a bandwidth of the closed loop gain stage 156. For example, the capacitor 124 may act as a short and apply $V_{cc}$ to the gate of the transistor 126 if the output signal of the EA 122 exceeds a certain frequency so that the closed loop gain stage 156 is less affected by high frequency noise in the bias circuit 100 and the closed loop gain stage 156 remains stable.

The drain of the transistor 126 may be coupled to a top current mirror 160 and a bottom current mirror 162. A current mirror is a circuit designed to copy a current through one active device by controlling the current in another active device of a circuit, keeping the output current constant regardless of loading. The top current mirror 160 may be further coupled to terminal 152 of the MR 150 and the bottom current mirror 162 may be further coupled to terminal 154 of the MR 150. Based on the closed loop gain stage 156, the current driver 158 may cause top current mirror 160 and bottom current mirror 162 to generate the source current to the terminal 152 and the sink current to terminal 154, respectively, that results in a difference between the currents $i_1$, $i_2$ in each branch 116, 118 being less than a threshold amount and a difference between the voltage across the MR 150 and the voltage of the voltage source 102 being less than a threshold amount.

The resistance of the MR 150 may dynamically increase or decrease based on a change in magnetic field produced by magnetization of the magnetic disk under the read/write head as the magnetic disk rotates causing the voltage across the MR 150 to be no longer equal to the voltage of the voltage source 102. The closed loop gain stage 156 may dynamically change the source current $i_3$ and sink current $i_4$ in response to $i_1$ and $i_2$ not being equal so that currents $i_1$ and $i_2$ are equal and MR 150 returns to constant voltage bias. The top current mirror 160 and bottom current mirror 162 may mirror the reference current $i_r$ current from the current driver to provide the source current to terminal 152 and the sink current to terminal 154. Based on this mirroring, the currents in branch 116 and branch 117 may be equal again and the voltage across the MR 150 and the voltage of the voltage source 102 may be less than a threshold amount so that the MR 150 has the constant bias voltage.

To illustrate operation of the bias circuit 100, consider that resistance of the MR 150 is represented by RMR, terminals 152, 154 are represented as P and N with a voltage $V_{pn}$, the TIA 120 has inputs C and D with respective voltages $V_c$ and $V_d$, and the input to the transistor 126 of the current driver 158 is represented as E with a voltage $V_e$. The voltage across the MR 150 is initially $V_{pn}$ which is equal to $V_b$ of the voltage source 102, and the current through the MR 150 is IMR.

In one example, if the RMR increases by a delta amount (i.e., RMR changes to RMR1, where RMR1>RMR), then the voltage $V_{pn}$ across the MR 150 is equal to IMR*RMR1. VP is greater than $V_b$, the current through the transistor 112 is greater than the current through transistor 106 and $i_2$ is greater than $i_1$ because the voltage between the base to emitter of transistor 112 is greater than the voltage between the base to emitter of transistor 106. Because $i_2$ is greater than $i_1$, $V_c$ is less than $V_d$ at the TIA 120. The voltage $V_e$ at the current driver 158 will increase which causes $i_r$ to decrease and the mirrored current by top current mirror 160 and bottom current mirror 162 to decrease. The current IMR in the MR 150 will decrease causing the voltage $V_{pn}$ across the MR 150 to decrease and return toward $V_b$ of the voltage source 102.

In another example, if the RMR decreases by a delta amount (i.e., RMR changes to RMR2, where RMR2<RMR), then the voltage $V_{pn}$ across the MR 150 is equal to IMR*RMR2. $V_{pn}$ is less than $V_b$, the current through the transistor 112 is less than the current through transistor 106 and $i_2$ is less than $i_1$ because the voltage between the base to emitter of transistor 112 is less than the voltage between the base to emitter of transistor 112. Because $i_2$ is less than $i_1$, $V_c$ is greater than $V_d$ at the TIA 120. The voltage $V_e$ at the current driver 158 will decrease which causes $i_r$ to increase and the mirrored current by top current mirror 160 and bottom current mirror 162 to increase. The current IMR in the MR 150 will increase causing the voltage $V_{pn}$ across the MR 150 to increase and return toward $V_b$ of the voltage source 102.

The source current from the top current mirror 160 and sink current from the bottom current mirror 162 may each take time to settle after being changed, where settling is the time for a response to reach a certain percentage of a final or steady state value. Further, the top current mirror 160 and the bottom current mirror 162 may be balanced, meaning that a difference in time for the source current at terminal 152 from the top current mirror 160 to settle and the sink current at terminal 154 from the bottom current mirror 162 to settle is less than a threshold amount. In some examples, the settling time of the source current and the settling time of the sink current may be substantially the same and the threshold amount may be close to zero. In examples, the top current mirror 160 and bottom current mirror 162 may be balanced if a number of current mirrors associated with the top current mirror 160 is the same as a number of current mirrors associated with bottom current mirror 162 so that a difference in settling time of the source current and sink current is reduced. For example, the top current mirror 160 and bottom current mirror 162 may each include two current mirrors so that the source current from the top current mirror 160 and the sink current from the bottom current mirror 162 settle at substantially the same time. The substantially same settling time reduces voltage glitches at the MR 150 and the signal output by the preamplifier which is used by signal processing circuitry to read the data on the magnetic disk of the HDD.

Figure 2:
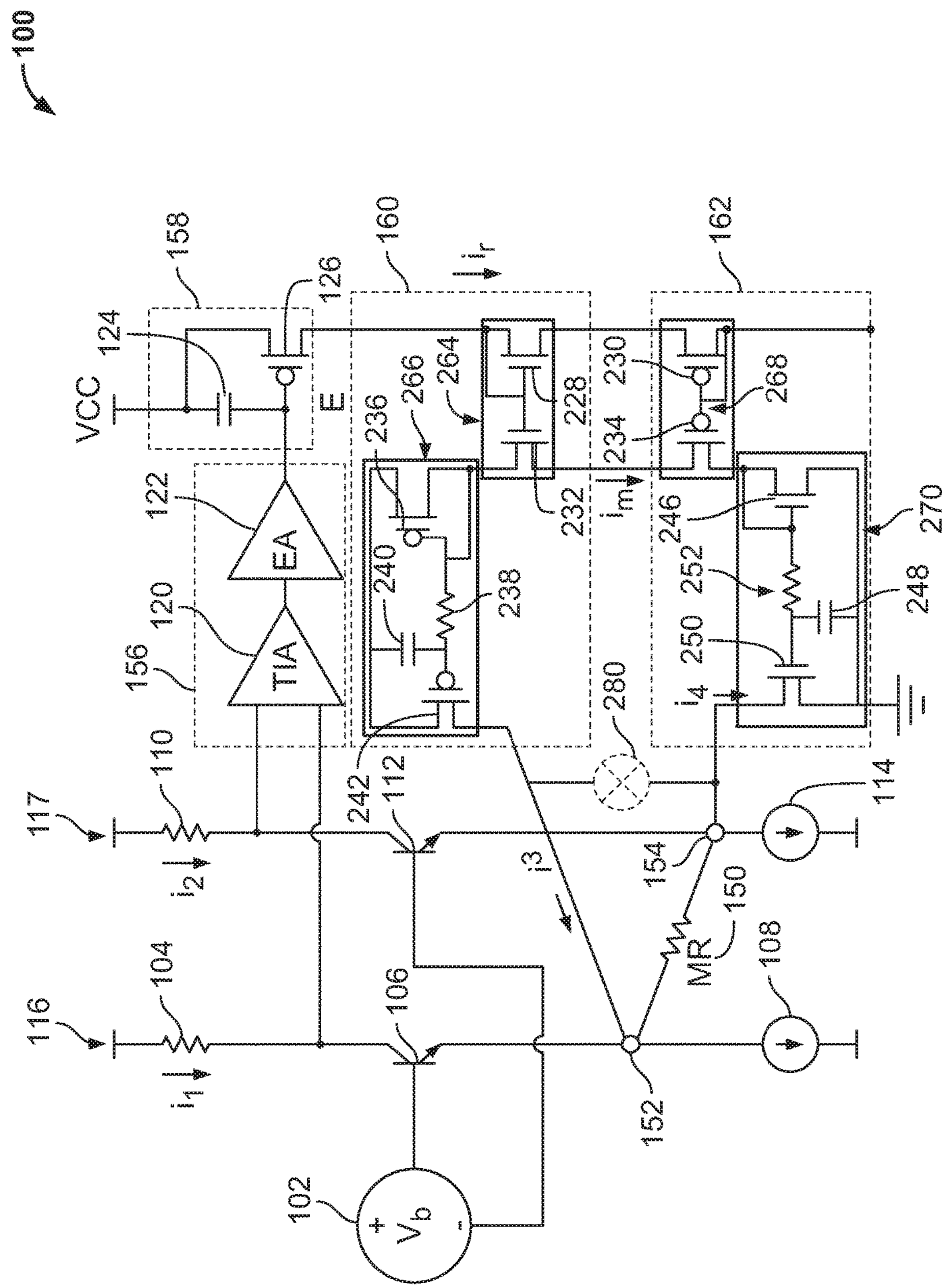
FIG. 2 illustrates another example bias circuit in the preamplifier for biasing the magnetic resistor with balanced current mirrors for providing the source current and the sink current to the MR.

FIG. 2 illustrates an example of the bias circuit 100 in the preamplifier for biasing the MR 150 in the HDD. Specifically, the example bias circuit 100 in FIG. 2 shows circuitry for the top current mirrors 160 and bottom current mirror 162 which provides the source current and sink current, respectively, to MR 150. The example bias circuit 100 shown in FIG. 2 includes certain components similar to those described with respect to FIG. 2. The description of these components has been provided above and will be omitted here for clarity purposes.

Top current mirror 160 includes current mirror 264 and current mirror 266. Current mirror 264 includes a transistor 228 which receives the reference current $i_r$ which is mirrored by transistor 232 to produce intermediate current $i_m$. Current mirror 266 includes a transistor 236 to receive this mirrored current (a reference) and which is mirrored by transistor 242 and to provide the source current $i_r$ to terminal 152 of the MR 150. The current mirror 264 may be arranged with N-type metal-oxide-semiconductor (NMOS) transistors to mirror current based on the reference current $i_r$ and to produce the intermediate current $i_m$ (a reference). The current mirror 266 may be arranged with PMOS transistors which changes a direction of the intermediate current $i_m$ to generate the source current into terminal 152 and to a lower potential. In this regard, the current mirror 266 with PMOS transistors is a current source mirror which sources the source current to the MR 150 since the current flows to terminal 152 and then to a lower potential. Resistor 238 and capacitor 240 may stabilize the closed loop by causing zeros to be added at the same locations as unstable poles in a transfer function associated with the closed loop gain stage 156.

Bottom current mirror 162 includes current mirror 268 and current mirror 270. Current mirror 268 includes a transistor 230 which receives the reference current $i_1$ which is mirrored by transistor 234 to produce intermediate current $i_m$. Current mirror 270 includes a transistor 246 to receive this mirrored current (a reference) and which is mirrored by transistor 250 and to provide the sink current $i_4$ to terminal 154 of the MR 150. The current mirror 268 may be arranged with PMOS transistors to mirror current based on the reference current $i_1$ and to produce the intermediate current $i_m$ (a reference) and the current mirror 270 may be arranged with NMOS transistors to generate the sink current to terminal 154. In this regard, the current mirror 270 with NMOS transistors is a current sink mirror which sinks the sink current from the MR 150 since the current flows from terminal 154 to a lower potential. Resistor 252 and capacitor 248 may stabilize the closed loop by causing zeros to be added at the same locations as unstable poles in a transfer function associated with the closed loop gain stage 156.

Both the top current mirror 160 and the bottom current mirror 162 may each include two current mirrors 264 and 266 for the top current mirror 160 and two current mirrors 268 and 270 for the bottom current mirror 162. In this regard, a difference in time between when the source current settles and when the sink current settles after current change may be less than a threshold amount, e.g., time for the source current setting and sink current setting may be substantially the same. The substantially same settling time reduces voltage glitches at the MR 150 and on the signal output by the preamplifier which is used by signal processing circuitry to read the data on the magnetic disk of the HDD. The source current and sink current may result in currents in branch 116 and branch 117 being substantially equal, maintaining the constant bias voltage across the MR 150.

In examples the transistors in top current mirror 160 and bottom current mirror 162 may be similarly sized so that settling times of respective currents are substantially the same. In some examples, the bias circuit 100 of FIG. 2 may include a switch 280 which is shown as a dotted structure to indicate it is optional. The switch 280 may be used to switch the source current from current mirror 266 to flow to the terminal 154 and the sink current from current mirror 270 to flow to the terminal 152.

Figure 3:
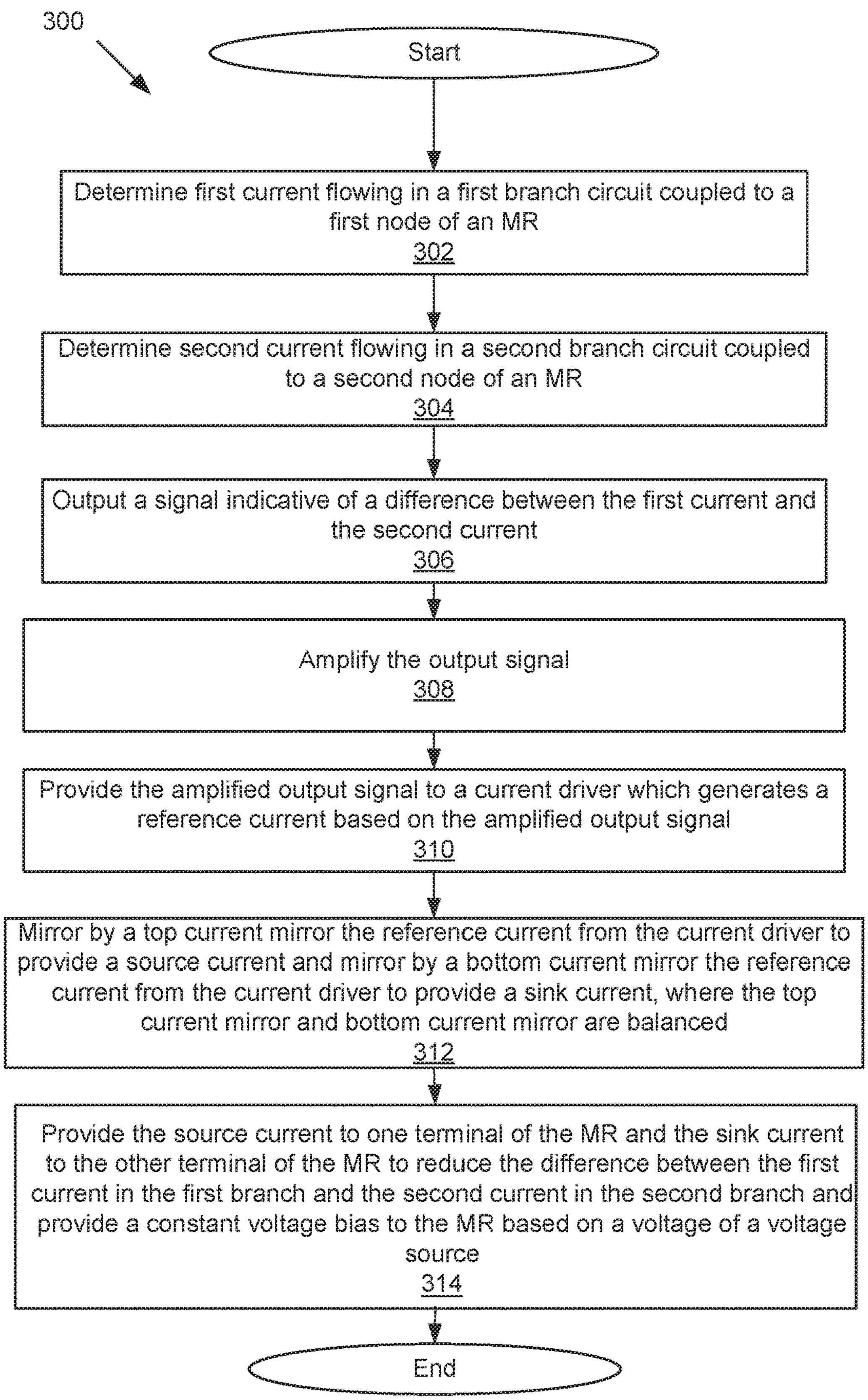
FIG. 3 is an example flow chart of functions associated with biasing the magnetic resistor of the HDD with the example bias circuit of FIG. 1 or 2 having balanced current mirrors for providing the source current and the sink current to the MR.

FIG. 3 is an example flow chart of functions 300 associated with biasing the magnetic resistor of the HDD with the bias circuit 100 shown in FIGS. 1 and/or 2 having the balanced current mirrors for providing source current and sink current to the MR 150. The functions 300 may be performed by the example bias circuit 100 in hardware and/or circuitry.

At 302, first current flowing in a first branch circuit 116 to a first terminal 152 of an MR 150 is determined. The first current may be determined at a terminal of the resistor 104 and is indicative of current it in branch 116.

At 304, second current flowing in a second branch circuit 117 to a second terminal 154 of the MR 150 is determined. The second current may be determined at a terminal of the resistor 110 and is indicative of current $i_2$ in branch 117.

At 306, a signal is output indicative of the difference between the first current and second current. The TIA 120 may receive the indications of the currents flowing and output the signal.

At 308, the output signal is amplified. One or more of the TIA 120 or EA 122 may amplify the output signal.

At 310, the amplified output signal is provided to a current driver 158 which generates a reference current based on the amplified output signal. The amplified output signal is applied to the transistor 126 which generates current $i_r$.

At 312, a top current mirror 160 mirrors the reference current from the current driver 158 to provide a source current and a bottom current mirror 162 mirrors the reference current from the current driver 158 to provide a sink current, where the top current mirror 160 and bottom current mirror 162 are balanced. The top current mirror 160 and bottom current mirror 162 may be balanced by having the same number of current mirrors in the top current mirror 160 compared to the bottom current mirror 162, so that a difference in settling time of the source current of the top current mirror 160 and settling time of the sink current of the bottom current mirror 162 is less than a threshold amount.

At 314, source current is provided to terminal 152 of the MR and the sink current is provided to the terminal 154 of the MR 150 to reduce the difference between the first current in branch 116 and the second current in branch 117 and provide a constant voltage bias to the MR based on the voltage source 102. The source current and sink current provided to terminal 152 and terminal 154 of the MR 150 results in the current in branch 116 and branch 117 being substantially the same and the voltage across the MR 150 being substantially the same as the voltage of the voltage source, producing the constant voltage bias across the MR 150. The substantially same settling time of the source current and settling time of the sink current reduces voltage glitches at the MR 150 and on the signal output by the preamplifier which is used by signal processing circuitry to read the data on the magnetic disk of the HDD.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A bias circuit comprising:

a closed loop gain stage arranged to determine a difference between a first current in a first branch circuit and a second current in a second branch circuit, wherein the first branch circuit and the second branch circuit are coupled to respective terminals of a magnetic resistor (MR); and a first set of current mirrors and a second set of current mirrors which are balanced, the first set of current mirrors arranged to provide a source current to one of the terminals of the MR and the second set of current mirrors arranged to provide a sink current to another of the terminals of the MR to reduce the difference between the first current and the second current and provide a constant voltage bias to the MR based on a voltage of a voltage source.

2. The bias circuit of claim 1, wherein the first set of current mirrors comprises a current source mirror which sources the source current to the MR and the second set of current mirrors comprises a current sink mirror which sinks the sink current from the MR.

3. The bias circuit of claim 1, wherein each set of current mirrors have a same number of current mirrors.

4. The bias circuit of claim 1, wherein when the difference between the first current and the second current is less than a threshold amount, a voltage across the terminals of the MR is equal to the voltage of the voltage source.

5. The bias circuit of claim 1, further comprising a switch for providing the source current to the other of the terminal of the MR and the sink current to the one of the terminals of the MR.

6. The bias circuit of claim 1, further comprising a current driver which provides a reference current to the first set of current mirrors and to the second set of current mirrors.

7. The bias circuit of claim 6, further comprising a capacitor coupled between a gate of a transistor of the current driver and a voltage reference.

8. The bias circuit of claim 1, wherein the first set of current mirrors comprises a first NMOS (N-type metal oxide semiconductor) transistor and second NMOS transistor of a first current mirror and a third PMOS (P-type metal oxide semiconductor) transistor and fourth PMOS transistor of a second current mirror.

9. The bias circuit of claim 1, wherein the second set of current mirrors comprises a first PMOS transistor and second PMOS transistor of a first current mirror and a third NMOS transistor and fourth NMOS transistor of a second current mirror.

10. The bias circuit of claim 1, wherein a settling time of the source current and a settling time of the sink current are substantially equal.

11. A method comprising:

determining a difference between a first current in a first branch circuit and a second current in a second branch circuit, wherein the first branch circuit and the second branch circuit are coupled to respective terminals of a magnetic resistor (MR);

outputting a reference current based on the difference; and performing a balanced mirroring of the reference current by a first set of current mirrors mirroring the reference current to provide a source current to one of the terminals and a second set of current mirrors mirroring the reference current to provide a sink current to another of the terminals, the source current and the sink current reducing the difference between the first current and the second current to provide a constant voltage bias to the MR based on a voltage of a voltage source.

12. The method of claim 11, wherein the first set of current mirrors mirroring the reference current comprises mirroring the reference current by a current sink mirror which sinks the sink current from the MR.

13. The method of claim 12, wherein the current sink mirror inverts a direction of the reference current which is mirrored.

14. The method of claim 11, wherein the second set of current mirrors mirroring the reference current comprises mirroring the reference current by a current source mirror which sources the source current to the MR.

15. The method of claim 11, where a settling time of the source current and the sink current are substantially equal.

16. The method of claim 11, wherein the first set of current mirrors and the second set of current mirrors each comprise two current mirrors.

17. The method of claim 11, further comprising determining data stored on a magnetic disk based on a resistance of the MR.

18. A bias circuit comprising:

a first branch comprising a first resistor and a first transistor, wherein one terminal of the first resistor is coupled to a collector of the first transistor, another terminal of the first resistor is coupled to a voltage reference, and an emitter of the first transistor is coupled to one terminal of an MR;

a second branch comprising a second resistor and a second transistor, wherein one terminal of the second resistor is coupled to a collector of the second transistor, another terminal of the second resistor is coupled to the voltage reference, and an emitter of the second transistor is coupled to another terminal of the MR;

a closed loop gain stage comprising a transimpedance amplifier (TIA) with one input coupled to the one terminal of the first resistor and another input coupled to the one terminal of the second resistor and an input of an error amplifier (EA) coupled to an output of the TIA;

a current driver coupled to an output of the EA; and a first set of current mirrors coupled to the current driver and the one terminal of the MR and a second set of current mirrors coupled to the current driver and the other terminal of the MR, wherein each set of current mirrors have a same number of current mirrors.

19. The bias circuit of claim 18, wherein the first set of current mirrors comprises a first NMOS (N-type metal oxide semiconductor) transistor and second NMOS transistor of a first current mirror and a third PMOS (P-type metal oxide semiconductor) transistor and fourth PMOS transistor of second current mirror.

20. The bias circuit of claim 19, wherein the second set of current mirrors comprises a third PMOS transistor and fourth PMOS transistor of a third current mirror and a fifth NMOS transistor and sixth NMOS transistor of a fourth current mirror.

* * * * *